(12) United States Patent
Marchese et al.

(10) Patent No.: US 6,660,798 B1
(45) Date of Patent: Dec. 9, 2003

(54) MIXTURES OF FLUOROPOLYMER DISPERSIONS

(75) Inventors: Enrico Marchese, Asti (IT); Mario Visca, Alessandria (IT); Daria Lenti, Alessandria (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/588,625

(22) Filed: Jun. 7, 2000

(30) Foreign Application Priority Data

Jun. 8, 1999 (IT) .......................................... MI99A1269

(51) Int. Cl.$^7$ ................................................ C08K 3/00
(52) U.S. Cl. ....................................................... 524/520
(58) Field of Search ......................................... 524/520

(56) References Cited

U.S. PATENT DOCUMENTS

| | | | |
|---|---|---|---|
| 3,242,218 A | 3/1966 | Miller | 260/615 |
| 3,665,041 A | 5/1972 | Sianesi et al. | 260/615 A |
| 3,715,378 A | 2/1973 | Sianesi et al. | 260/463 |
| 4,334,039 A | 6/1982 | Dupre | 525/263 |
| 4,385,157 A | 5/1983 | Auclair et al. | 525/316 |
| 4,523,039 A | 6/1985 | Lagow et al. | 568/615 |
| 4,657,966 A | 4/1987 | Mallya | 524/747 |
| 4,864,006 A | 9/1989 | Giannetti et al. | 526/209 |
| 4,990,283 A | 2/1991 | Visca et al. | 252/309 |
| 5,144,092 A | 9/1992 | Marraccini et al. | 568/615 |
| 5,576,381 A * | 11/1996 | Bladel | 524/544 |

FOREIGN PATENT DOCUMENTS

| | | |
|---|---|---|
| DE | 197 26 802 C1 | 6/1998 |
| EP | 0 148 482 A2 | 7/1985 |
| EP | 0 248 446 A2 | 12/1987 |
| EP | 0 369 466 A2 | 5/1990 |
| EP | 0 633 257 B1 | 1/1995 |
| EP | 0 657 514 A1 | 6/1995 |
| EP | 0 969 027 A1 | 1/2000 |
| EP | 0 969 055 A1 | 5/2000 |
| GB | 1104482 | 4/1965 |
| WO | WO 98/58984 | 12/1998 |

OTHER PUBLICATIONS

Chu et al., J. of Applied Polymer Science, vol. 70, pp. 2667–2677(1998); "High Solid Content Multisized Emulsion Copolymerization of Styrene, Butyl Acrylate, and Methacrylic Acid".

Chu et al., Colloid Polym. Sci., vol. 275, pp. 986–991 (1997); "Characterization of particle size and size distribution of multi–sized polymer lattices by centrifugation plus quasielastic light scattering".

Chu et al., Colloid Polym. Sci., vol. 276, pp. 276–305 (1998); "Rheology of concentrated multi–sized poly(St/BA/MMA) latices".

Polinski et al., J. of Rheology, vol. 32, No. 8, pp. 751–771 (1988); "Rheological Behavior of Filled Polymeric Systems II. The Effect of a Bimodal Size Distribution of Particles".

Italian Patent Application No. M98A 001519, 1998.

Chong et al., J. Applied Polymer Science, vol. 15, pp. 2007–2021 (1971); "Rheology of Concentrated Suspensions".

L. López de Arbina et al.; Polymer, vol. 33, No. 22, pp. 4832–4837(1992); "High–solids–content batch miniemulsion polymerization".

* cited by examiner

Primary Examiner—Edward J. Cain
(74) Attorney, Agent, or Firm—Arent Fox Kintner Plotkin & Kahn

(57) ABSTRACT

Mixtures of fluoropolymer dispersions comprising:
a) one or more dispersions constituted by TFE homopolymers or by its copolymers with particle average sizes ranging from 180 to 400 nm;
b) one or more TFE copolymer dispersions with one or more monomers containing at least one ethylene unsaturation, the comonomer amount being such that the dispersion contains a number of fibrils lower than 10% of the total number of particles; said fibrils being polymer particles having a length/diameter (L/D) ratio higher than 5; the dispersion particle average sizes are smaller of about 90 nm; the component b) contains a comonomer amount such that the resulting polymer is not elastomeric and furthermore it shows composition and viscosity characteristics of the melt such as not to be thermoprocessable.

17 Claims, No Drawings

MIXTURES OF FLUOROPOLYMER DISPERSIONS

The present invention relates to aqueous fluoropolymer dispersions to be used in coating for surfaces, preferably metal and ceramic surfaces, and in the textile-impregnation and cast film manufacture.

Specifically, the present invention relates to aqueous fluoropolymer dispersions able to give films having an high critical thickness and an acceptable shelf life for industrial cycles, not lower than 6 months. The films obtained from these dispersions show good mechanical properties also at high temperatures, good optical properties, as well as reduced porosity and roughness of the film surface.

With critical thickness the maximum thickness obtainable without cracks and surface defects in the film, is meant.

It is very important from the application point of view to increase the limit of the critical thickness so as to have films free from cracks in correspondence of an higher thickness. A higher critical thickness allows greater freedom degrees in formulating and applying formulations with the various technologies and a higher reliability of the product in the transformation process. An higher critical thickness means high productivity in coating industrial cycles for metal surfaces, impregnation and cast films. This feature however must not decrease the mechanical and optical properties.

It is known in the prior art that dispersions of polymers with broadened particle size distribution (PSD) show improved Theological characteristics, in particular a lower viscosity, the solid fraction by volume in the dispersion being equal, from the point of view of their application in various industrial fields. See for example J. of Applied Polymer Sci., 15, 2007–2021 (1971) and Polymer, 33 (22), 4832–4837 (1992). This concept has been applied for obtaining dispersions with bimodal or multimodal PSDs. For example for styrene-butadiene rubber latexes (SBR) see U.S. Pat. No. 4,657,966; for acrylonitrile-butadiene-styrene (ABS) latexes see U.S. Pat. No. 4,385,157; for rubber latex blends see U.S. Pat. No. 4,334,039. As prior art scientific papers, J. of Applied Polymer Sci., 70, 2667–2677 (1998), Colloid Polymer Sci. 276, 305–312 (1998), Colloid Polymer Sci. 275, 986–991 (1997), J. of Rheology 32, 751–771 (1988), can be mentioned.

The same concept applied to the fluoropolymer aqueous dispersions is reported in EP 657,514. This patent describes the use of fluoropolymer dispersion mixtures, expressly excluding thermoplastic polymers, obtained by emulsion polymerization and mixed for obtaining bimodal particle size distributions in order to optimize, specifically in the textile impregnation field, the polymer amount applied in each passage without crack formation. The ratio between the particle sizes having a smaller diameter and the particle sizes having a greater diameter is in the range 0.3–0.7. The first dispersion has a particle number average diameter in the range 180–440 nm, while the second fluoropolymer dispersion has an average diameter in the range 50–150 nm. The amount of the component having the smaller diameter compared with the component with the greater diameter is in the range 5–50% by weight, preferably 5–20% by weight. The examples reported in this patent substantially relate to the textile impregnation and show that, by using an amount of 10% and 18% by weight of the component having a smaller size, cracks are eliminated and the fluoropolymer amount applied in each passage increases. If amounts other than these two values are used, cracks are noticed. In the Examples, the polymer having a smaller size, has particle sizes in the range 100–110 nm and the above mentioned ratio ranges from 0.45 to 0.5. The only example given on the metal coating shows that with an amount equal to 10% of the fluoropolymer having smaller size particles, the film hardness increases compared with the case where the film is obtained by solely using the fluoropolymer having the high sizes as above defined.

The Applicant has tried to reproduce the Examples by using the small particle sizes towards the lowest value mentioned in the patent, also by using for example a larger amount of surfactant with respect to the patent teaching and to the amounts mentioned in the patent Examples. The Applicant has also made other attempts to reproduce the patent by extrapolating the teachings beyond the lowest ratio limit between small and great particles indicated in the patent (lower than 0.3). All these attempts of the Applicant have caused instability phenomena of the latex, both as such and stabilized with non ionic surfactants, as well as a global property worsening, such as for example critical thickness, mechanical properties, film gloss, after a storage of even 1–2 days or 1–2 weeks. This represents a limit from the application point of view since the dispersions should be prepared and used in a short period of time, incompatible with the industrial cycles. In any case said latexes after 2–3 months ageing do not allow to maintain the initial properties as above indicated. From the industrial point of view said latexes have a poor utility.

The same PSD concept has been applied for bimodal distributions in the patent WO 98/58984 wherein, in comparison with EP 657,514, a fluorinated thermoplastic polymer as one of the mixture components is used. The teaching of this patent allow to materialize the favourable bimodality effects, extended towards small particle populations under 80 nm, but it is limited and specific for thermoprocessable polymers, therefore with the drawback to worsen the mechanical properties at high temperatures.

Processes of the prior art to obtain small fluoropolymer particles under 100 nm use high surfactant amounts. See for example EP 248,446 and EP 369,466 relating to polytetrafluoroethylene (PTFE) particles. The obtained particles are anisotropic with a length-diameter L/D ratio higher than 5: these particles are commonly called fibrils.

The need was felt to obtain aqueous fluoropolymer dispersions capable to give films having an high critical thickness combined with good optical and mechanical properties also at high temperatures, reduced porosity and roughness and having an industrially acceptable shelf life, i.e., such as to maintain said properties after a prolonged dispersion storage of at least 6 months.

The Applicant has unexpectedly and surprisingly found that the instability (shelf-life) problems and the non obtainment of the desirable film performances (see above) are correlated to the presence of fibrils in the small size particle population. The Applicant has found that it is possible to solve the above mentioned technical problem by using the dispersions as defined hereinunder.

It is therefore an object of the present invention fluoropolymer dispersion mixtures comprising:

a) one or more dispersions formed by tetrafluoroethylene (TFE) homopolymers or by its copolymers with one or more monomers containing at least one unsaturation of ethylene type in amounts from 0 to 8% by weight, preferably from 0.01 to 3% by weight; the average particle sizes range from 180 to 400 nm, preferably from 200 to 300 nm;

b) one or more tetrafluoroethylene (TFE) dispersions with one or more monomers containing at least one ethylene unsaturation, the comonomer amount being such that the dispersion contains a fibril number lower than 10% of the particle total number, preferably lower than 5%, still more preferably lower than 1%, said fibrils being polymer particles having a length/diameter (L/D) ratio higher than 5; the fibrile number determination is carried out with an atomic force microscope (AFM); the dispersion particle average sizes are smaller than about 90 nm, preferably in the range 10–80 nm, more preferably 20–60 nm; component b) contains a comonomer amount such that the resulting polymer is not elastomeric and furthermore it shows composition and viscosity of the melt such as to be non thermoprocessable.

The dispersion mixture formed by a) and b) generally shows composition and viscosity of the melt such as to be non thermoprocessable.

As said the dispersion b) contains a fibril number lower than 10% of the particle total number, preferably lower than 5%, still more preferably lower than 1%. It has been found by the Applicant that the dispersions containing said fibrils in higher amounts, even though said dispersions are initially effective in increasing the critical thickness, show during the time, from few days to 1–2 months depending on the cases, a decrease of the critical thickness increase, as well as of the other performances until elimination of the advantages deriving from the use of a bimodal (polydispersed) mixture. Besides, instability problems of the dispersion and formulations obtained therefrom during the coating application arise, problems which makes the dispersions unusable.

According to a theory, however non binding, the Applicant thinks that the fibrils present in the dispersion tend to form separated phase and to link each other and with the spheroidal particles of the larger particle dispersion, giving rise to instability sites which obstacle a correct application of the dispersion to give good quality coatings having the combination of the above mentioned properties. These separation and aggregation phenomena take place both when the dispersion is that directly obtained from the polymerization, and when it is further stabilized with surfactants.

The Applicant has found that in order to obtain the present invention results, it is necessary to have at least two dispersions having the above particle sizes distributions and having a fibril percentage in the dispersion b) lower than that above mentioned.

The weight ratio between component a) and component b) as dry product ranges between 99/1 and 80/20, preferably between 99/1 and 90/10, more preferably between 92/8 and 95/5.

The dispersion are usually used at a concentration of the dry product in the range 25%–75% by weight and preferably 40%–65% by weight.

The mixture can be obtained by simple mixing the component a) previously concentrated by the known methods (addition of non ionic surfactant and heating or ultrafiltration) with the component b) so as it is obtained from the polymerization autoclave or concentrated as above for component a) or it can be obtained by coconcentration of the two latexes.

The ratio between the dispersion b) particle sizes compared with those of the dispersion a) is preferably lower than 0.3, more preferably in the range 0.1–0.25.

Furthermore the Applicant has found that the widening of the dispersion b) particle size distribution until comprising the population tails of the dispersion a), leads to a more constant increase of critical thickness in a wider range of compositions. Said widening can be obtained by mixing more dispersions of type b) having a different average diameter.

Among the TFE comonomers one can cite the fluorinated ones. Examples of the latter are:
perfluoroolefins $C_3$–$C_8$, such as hexafluoropropene (HFP);
hydrogenated fluorooelfins $C_2$–$C_8$, such as vinyl fluoride (VF), vinylidene fluoride (VDF), trifluoroethylene, hexafluoroisobutene, perfluoroalkylethylene $CH_2=CH$—$R_f$, wherein $R_f$ is a perfluoroalkyl $C_1$–$C_6$; chloro- and/or bromo- and/or iodo-fluoroolefins $C_2$–$C_8$, such as chlorotrifluoroethylene (CTFE);
(per)fluoroalkylvinylethers (PAVE) $CF_2=CFOR_f$, wherein $R_f$ is a (per)fluoroalkyl $C_1$–$C_6$, for example $CF_3$, $C_2F_5$, $C_3F_7$;
(per)fluoro-oxyalkylvinylethers $CF_2=CFOX$, wherein X is: an alkyl $C_1$–$C_{12}$, or an oxyalkyl $C_1$–$C_{12}$, or a (per)fluoro-oxyalkyl $C_1$–$C_{12}$ having one or more ether groups, for example perfluoro-2-propoxy-propyl;
fluorodioxoles, preferably perfluorodioxoles;
non conjugated diens of the type:
$CF_2=CFOCF_2CF_2CF=CF_2$,
$CFX^1=CX^2OCX^3X^4OCX^2=CX^1F$
wherein $X^1$ and $X^2$, equal to or diferrent from each other, are F, Cl or H; $X^3$ and $X^4$, equal to or different from each other, are F or $CF_3$, which during the polymerization cyclopolymerize.

Generally, the comonomer amount in the polymer of dispersion b) is in the range of about 0.5–20% by weight, preferably 1.5–18% by weight, and it is in connection with the kind of comonomer. The skilled in the field is easily capable by routine tests to determine the comonomer amount to have a non thermoprocessable polymer, that is, not workable from the melt (non thermomouldable by extrusion in manufactured articles).

The Applicant has found that the best results are obtained with the contemporaneous use of its polymerization technology in fluorinated microemulsion, described in the European patent application EP 99112083.3 in the name of the Applicant, and of comonomers having an high modifying capability; for example (per)fluorodioxoles having the formula (I):

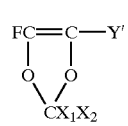

are preferred, wherein Y'=—H, —Cl, —F, —$CF_3$, —O—$CF_3$; $X_1$ and $X_2$ equal to and different from each other are F or $CF_3$. Preferably Y'=—O—$CF_3$ and $X_1$, $X_2$ =F since with the synthesis process described in EP 633,257 for these comonomers a structured 80/20 sin/anti dioxole is obtained.

The preferred comonomers according to the present invention are those which do not substantially lower the PTFE thermal stability and the molecular weight.

Alternatively to the dioxoles of formula (I), dienes as above mentioned which cyclopolymerize during the polymerization, can be used.

The dioxole class (I) allows to obtain dispersions with average dimension, measured by PCS, from 20 nm to 80 nm, practically free from fibrils and with polymer dry fractions higher than 20% by weight, preferably higher than 25% by weight. The polymer forming the dispersions b) contains an amount of comonomer (I) preferably in the range 1.1%–3% by weight, more preferably 1.5–2.5% by weight.

A further advantage of the perfluorinated comonomer class (I) is the capability not to give monomolecular termination reactions when the comonomer has entered the macromolecular chain and therefore to allow the obtainment of high molecular weights, such as to guarantee improved mechanical properties, especially at high temperatures, even higher than 200° C.

The Applicant has found that it is possible to limit the fibril formation under the mentioned values, also by polymerizing under such conditions so as to obtain the dispersion b) with average size particles over 100 nm. However these dispersions do not produce the positive effects combined with the bimodal (polydispersed) distributions.

By using as comonomers perfluoroalkylvinylethers, in the case of perfluoropropylvinylether (PVE) the amount ranges from 3 to 5% by weight; in the case of mixture PVE with perfluoromethylvinylether (MVE) an amount from 4 to 10% by weight, preferably from 3 to 5% by weight, can be used.

The molecular weight of the polymer of dispersion b) can be regulated by conventional transfer agents, for example ethane. The molecular weight can also be regulated through the polymerization initiator amount. However it is to be noticed that by lowering the molecular weight the mechanical properties at high temperatures are worsened.

It is to be noticed that using comonomers different from the dioxoles (I), high molecular weights necessary to have the very good mechanical properties of the present invention, are not obtained.

As known, the viscosity of the melt, so that the polymer is not thermoprocessable, is generally higher than $10^9$ Pas.

Also copolymers having a viscosity in the range $10^3$–$10^9$ Pas can be used, provided that the composition is such to make the copolymer non thermoprocessable.

The combination of the properties obtainable by using the present invention dispersions, in particular a remarkable increase of the critical thickness, could be explained, without to be bound to any theory, by hypothetizing a mechanism whereby the particles of dispersion b) do not statistically link together with the larger particles (dispersion a)), but they preferably segregate between each other and take up interstitial spaces and favour at any rate a greater aggregation density in the film formation critical step, i.e. during the drying phase.

This would lead to a thicker structure which would explain an higher resistance to the crack formation which generally takes place during the film drying phase, when there are strong biaxial stresses inside the film.

The type a) aqueous dispersions are obtainable with the conventional emulsion polymerization processes.

The type b) dispersions are obtainable with the process described in detail in the European patent application EP 99112083.3, herein incorporated by reference. Specifically it comprises the following steps:

a) preparation of a perfluoropolyether (PFPE) aqueous microemulsion having perfluorinated end groups or end groups optionally containing 1 or more H atoms, Cl instead of fluorine;

b) feeding of the microemulsion to the polymerization reactor in such amount wherefore the microemulsion perfluoropolyether oil phase is present in a concentration higher than 2 ml for liter of reaction medium;

c) feeding of the reaction medium to the polymerization reactor, reactor degassing, reactor pressurization with gaseous TFE, optional addition of surfactants, stabilizers, comonomes, transfer agents;

d) addition of the initiator, and optionally during the polymerization, of further amounts of surfactants, stabilizers, comonomers, transfer agents;

e) discharge from the reactor of the polymeric latex.

The microemulsion feeding mentioned at point b) can also be carried out after feeding of the reation medium and of the other ingredients mentioned at point c).

Besides the components mentioned at points c) and d) other components commonly used in the TFE polymerization can also be added. For example, polymerization inhibitors, buffers, etc., can be mentioned.

During the polymerization additional initiator and the other components mentioned in c) and in d) can be added even though they have already been introduced into the reactor at the beginning of the reaction.

As said, it has been unexpectedly found by the Applicant that it is essential to refer not only to the average diameter of the particle size distribution, but also to the shape factor of the obtained polymer primary particles. Specifically, it is important that most particles have a spheroidal shape and that the number of fibrils is lower than the above mentioned limits.

The microemulsions used in the process of the present invention are described in U.S. Pat. No. 4,864,006 and U.S. Pat. No. 4,990,283, herein incorporated by reference, wherein instead of the mentioned perfluoropolyethers having non reactive end groups, also hydrofluoropolyethers having one or both end groups containing one hydrogen atom or having one or more chlorine atoms instead of fluorine in the chain end groups, can be used. The surfactants which can be used both for preparing the microemulsion and during the polymerization, are those described in the mentioned patents or those having an end group wherein one or more fluorine atoms are substituted by chlorine and/or hydrogen. The PFPE molecular weight which can be used can also be lower than 500, for example even 300, as average molecular weight by number. The nanoemulsions obtained by the use of PFPE having a low molecular weight, in the range 350–600, preferably 350–500, can more advantageously be used in the applications wherein their quantitative removal is required.

The total surfactant amount used is such that the weight ratio between surfactant and TFE converted into polymer is preferably lower than 1.

The copolymer molecular weight of the dispersion b) obtained by the present invention process is such as to give a good chemical and thermal stability of the polymer. Generally the obtained molecular weights are higher than 50,000, for example 500,000–5,000,000.

During the polymerization, the temperatures and pressures conventional of the TFE polymerization processes are used.

As already said, with the invention dispersions the gloss and the scratch resistance of the obtained films, also at temperatures higher than 200° C., have improved. Particularly high gloss values are also obtainable by increasing the comonomer amounts in the small particle (b) populations, as well as in the great particle (a) populations. Preferably, as comonomers, the dioxoles of formula (I) which allow to obtain high molecular weights (in the range 500,000–5,000, 000) are used.

The obtained dispersion mixture can be suitably formulated in connection with the specific application with the addition of other aqueous resin dispersions, such as, acrylic resins, silicone resins, polyamidoamide resins, imide resins, etc.; pigments, surfactants, inorganic fillers and other additives, such as antifoam agents, extending agents, etc. After the mixture application to the desired surface, the film is dried and then sintered at a temperature higher than the polymer melting temperature.

The total surfactant amount necessary to stabilize the invention dispersion mixture generally ranges from 2 to 10% by weight, and it is preferably in the range 3–6% on the dispersion weight.

The fluoropolymer aqueous dispersions of the present invention, besides for coating applications on metal surfaces, can also be used for ceramic surfaces and in the textile impergnation and for obtaining cast films.

The invention dispersions as said allow a remarkable improvement in the film formation without the presence of cracks (greater critical thickness). However this higher property is not fully exploitable in the case of coatings of a vertical support, as it is the typical case of the textile impregnation, the cast film manufacture. Indeed the total amount of deposited solid depends on the wetting capability and on the rheological properties of the dispersion.

The Applicant has surprisingly found that the advantage of the better filming (absence of cracks) can be fully exploited by adding to the invention dispersions a non ionic fluorinated surfactant having the formula:

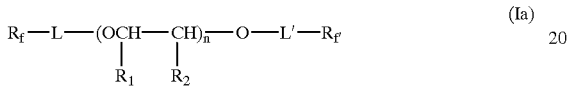
(Ia)

n is an integer in the range 4–60, preferably 8–30;
L and L', equal to or different from each other, are selected from:

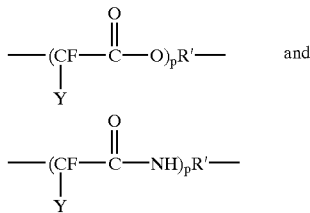

wherein: p is 0 or 1; Y can be F or $CF_3$;
R' is a $C_1$–$C_5$ alkylene radical;
$R_1$, $R_2$ can be both H or the one H and the other $CH_3$.
$R_f$ and $R_{f'}$, equal to or different from each other, can be perfluoropolyether radicals having a number average molecular weight in the range 250–1,500, preferably 400–1,000; perfluorocarbon radicals having the above mentioned average moelcular weight.

The $R_f$ and $R_{f'}$ perfluoropolyether radicals comprise a T end group and repeating units statistically distributed along the polymer chain selected from:

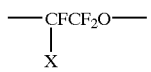

or —CFXO—, wherein X is equal to F or —$CF_3$;
—$CF_2(CF_2)_zO$— wherein z is an integer equal to 2 or 3;
—$CF_2CF(OR_{f''})O$— or —$CF(OR_{f''})O$— wherein $R_{f''}$ can be —$CF_3$,
—$C_2F_5$, or —$C_3F_7$.

The perfluoropolyether radical T terminal is selected from: —$CF_3$, —$C_2F_5$, —$C_3F_7$, $ClCF_2CF(CF_3)$—, $CF_3CFClCF_2$—, $ClCF_2CF_2$— and $ClCF_2$—, $CF_3CFHCF_2$—, $HCF_2CF_2$— and $HCF_2$—.

In particular the following $R_f$ and $R_{f'}$ perfluoropolyether radicals can be mentioned:

(a) T—O($CF_2CF(CF_3)O)_a(CFXO)_b$—
wherein: X is F or $CF_3$; a and b are integers such that the molecular weight is in the above mentioned range; a/b is in the range 10–100, and T is one of the above mentioned end groups;

(b) T—O($CF_2CF_2O)_c(CF_2O)_d(CF_2(CF_2)_zCF_2O)_h$—
wherein: c, d and h are integers such that the molecular weight is in the above mentioned range; c/d is in the range 0.1–10; h/(c+d) is in the range 0–0.05, z is an integer equal to 2 or 3, and T is one of the above mentioned end groups;

(c) T—O($CF_2CF(CF3)O)_e(CF_2CF_2O)_f(CFXO)_g$—
wherein: X is F or $CF_3$; e, f, g are integers such that the molecular weight is in the above mentioned range; e/(f+g) is in the range 0.1–10, f/g is in the range 2–10, T is one of the above mentioned end groups;

(d) T—O($CF_2O)_j(CF_2CF(OR_{f''})O)_k(CF(OR_{f''})O)_l$—
wherein: $R_{f''}$ is —$CF_3$, —$C_2F_5$, —$C_3F_7$; j, k, l are integers such that the molecular weight is in the above mentioned range; k+l and j+k+l are at least equal to 2, k/(j+l) is in the range 0.01–1,000, l/j is in the range 0.01–100; T is one of the above mentioned end groups;

(e) T—O—($CF_2(CF_2)_zCF_2O)_s$—
wherein: s is an integer such as to give the above mentioned molecular weight, z has the above defined meaning and T is one of the above mentioned end groups;

(f) T—O($CR_4R_5CF_2CF_2O)_{j'}$—wherein: $R_4$ and $R_5$ are equal to or different from each other and selected from H, Cl or perfluoroalkyl, for example having 1–4 C atoms, j' being an integer such that the molecular weight is that mentioned above;

(g) T—O($CF(CF_3)CF_2O)_{j''}$—
j" being an integer such as to give the above mentioned molecular weight.

These compounds and the methods for their preparation them are described in the patents GB 1,104,482, U.S. Pat. No. 3,242,218, U.S. Pat. No. 3,665,041, U.S. Pat. No. 3,715,378 and U.S. Pat. No. 3,665,041, EP 148,482 and U.S. Pat. No. 4,523,039, U.S. Pat. No. 5,144,092.

The preferred perfluoropolyether radicals of the present invention have the following structures:

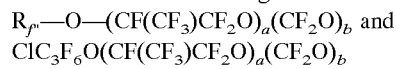

wherein the a/b ratio ranges from about 20 to about 40, and $R_{f''}$ has the above defined meaning.

The surfactant of formula (Ia) allows to improve rheology and wettability of the support.

Should a further improvement of the wettability be necessary in order to use completely the latex characteristics, the formulation can be additivated with a fluorinated non ionic surfactant having formula (Ib).

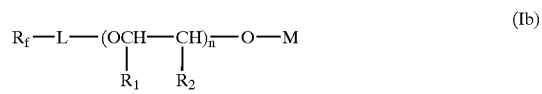
(Ib)

wherein: M=H, $CH_3$; $R_f$, L, $R_1$, $R_2$, n have the above mentioned meaning for the surfactant (Ia).

The surfactant amount of the formula (Ia) must be such as to lead to the suitable viscosity for the application. Geneally the surfactant amount depends on the component b) and on the optional components present in the dispersion. For example by using as component b) of about 50 nm, present in an amount of 5% by weight (95% by weight of the component a), the effective surfactant amount is in the range of 0.1% by weight.

The non ionic compounds having formulas (Ia) and (Ib) can be added to the dispersion in amounts generally in the range 0.1–5% by weight. When both the surfactants are additivated, the total amount must be lower than 5% by weight.

The following examples are mentioned for illustrative purposes, but they are not limitative of the invention scope.

EXAMPLES

Characterization

The particle average diameter is measured by an equipment based on Laser light diffusion, specifically on Photon Correlation Spectroscopy, equipped with a Brookhaven correlator model 2030 AT and Argon Laser light source having a wave length of 514.5 nm by Spectra-Phisics. The latex samples to be subjected to measurement, are suitably diluted with bidistilled water and filtered at 0.2 $\mu$m on Millipore filter. The scattering measurement is carried out at room temperature and at a 90° angle. The latex particle diameter is obtained by the accumulator method.

Determination of the Fibril Percentage.

A dispersion sample is deposited under the form of a thin film (about 10 $\mu$m) on a glass or metal plate and dried at room temperature. The photos are carried out by using an atomic force microscope and the fibril number percentage has been calculated on a total calculation of at least 250–300 particles.

The following Examples 1–9 refer to different polymerization techniques for preparing a dispersion type b). Tetrafluoroethylene (TFE) copolymer dispersions having a different comonomer content are obtained.

Example 1 Comparative 40 grams of aqueous solution of ammonium perfluorooctanoate (APFO) are added to 30 liters of suitably degassed water into a 50 liters autoclave equipped with a mechanical stirrer and previously put under vacuum. In the reactor also 140 grams of paraffin with softening point in the range 52–54° C. and 125 grams of perfluoro-5-methoxy-1,3-dioxole (MDO) were introduced. The autoclave is kept under mechanical stirring and is pressurized with tetrafluoroethylene (TFE) up to a pressure of 20 bar at a temperature of 83° C. At this point in the autoclave 500 cc of a $(NH_4)_2S_2O_8$ (APS) solution corresponding to 2,000 mg of APS, are fed.

When the pressure in the ractor has decreased of 0.5 bar, TFE is fed by means of a compressor so as to maintain a constant pressure of 20 bar inside the reactor. In the meantime the reactor internal temperature is increased up to 92° C. at a rate equal to 0.7° C./min. After 13 minutes the TFE feeding is stopped, the reactor is evacuated and cooled.

The polymer primary particle diameter measured by Laser Light Scattering (LLS) is equal to 114 nm. The infrared spectroscopy analaysis (FTIR) shows a MDO content in the polymer equal to 1% by weight.

The melt flow index (MFI), according to the ASTM D1238-52T method, was not measurable: this shows that the polymer is not processable from the melt.

Example 2

In a glass beaker are introduced:

5 parts by weight of an ammonic salt having the structure:

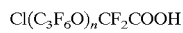

with n=2–5 and with an acidimetric molecular weight equal to 530;

3 parts by weight of a perfluoropolyether having the structure:

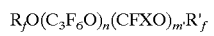

wherein n' and m' are integers such that the average molecular weight by number is 700, X is equal to F or $CF_3$; Rf, R'f equal to or different from each other are perfluoroalkyls from 1 to 3 carbon atoms;

8 parts by weight of water.

The Resulting Microemulsion is Perfectly Limpid.

16,500 grams of the preceding microemulsion are added to 275 liters of suitably degassed water in a 440 liters autoclave equipped with a mechanical stirrer and previously put under vacuum. In the reactor also 1000 grams of paraffin with softening point in the range 52–54° C. and 2,150 grams of perfluoro-5-methoxy-1,3-dioxole (MDO) were previously introduced. The autoclave is kept under mechanical stirring and is pressurized with TFE up to a 20 bar pressure at a temperature of 78° C. At this point in the autoclave 1500 cc of a $(NH_4)_2S_2O_8$ (APS) solution corresponding to 18 grams of APS, are fed.

When the pressure in the reactor has decreased of 0.5 bar, TFE is fed by means of a compressor so as to maintain a constant pressure of 20 bar inside the reactor. In the meantime the reactor internal temperature is increased up to 91° C. at a rate equal to 0.6° C./min. After 35 minutes, when 90 kg of TFE have reacted, the TFE feeding is stopped and the reactor is evacuated and cooled.

The polymer primary particle diameter measured by Laser Light Scattering (LLS) is equal to 40 nm.

The FTIR analysis shows a MDO content in the polymer equal to 1.67% by weight and the calorimetric analysis (DSC) shows a first melting point equal to 326° C.

The melt flow index (MFI), according to the ASTM D1238-52T method, was not measurable: this shows that the polymer is not processable from the melt. The fibril number determined as mentioned is lower than 5%.

Example 3A Comparative 2,130 grams of the microemulsion described in Example 2 are added to 30 liters of suitably degassed water into a 50 liters autoclave equipped with a mechanical stirrer and previously put under vacuum. In the reactor also 140 grams of paraffin with softening point in the range 52–54° C. were previously introduced. In the autoclave 500 cc of a $(NH_4)_2Fe—(SO_4)_2 6H_2O$ (SdM) solution corresponding to 500 mg of SdM, are fed.

The autoclave is kept under mechanical stirring and is pressurized with TFE up to a 20 bar pressure at a temperature of 75° C. At this point in the autoclave 500 cc of a $(NH_4)_2S_2O_8$ (APS) solution corresponding to 1500 mg of APS are fed.

When the pressure in the reactor has decreased of 0.5 bar, TFE is fed by means of a compressor so as to maintain a constant pressure of 20 bar inside the reactor. In the meantime the reactor internal temperature is increased up to 85° C. at a rate equal to 0.2° C./min. After 18 minutes the TFE feeding is interrupted, the reactor is evacuated and cooled. An aqueous dispersion containing 225 g/kg of polymeric resin is obtained.

The polymer primary particle diameter measured by Laser Light Scattering (LLS) is equal to 108 nm. After ultracentrifugation at 5,000 rpm for 1 hour, a solid amount (coarse particles) equal to 23.2% by weight of the total is separated and the LLS measurement on the surnatant phase gives a 35 nm value. The fibril number determined as mentioned is higher than 50%.

Example 3B Comparative 600 grams of ammonium perfluorooctanoate are added to 30 liters of suitably degassed water into a 50 liters autoclave equipped with a mechanical stirrer and previously put under vacuum. In the reactor also 140 grams of paraffin with softening point in the range 52–54° C. and 15 g of hexafluoropropene (HFP) were previously introduced. In the autoclave 500 cc of a $(NH_4)_2Fe(SO_4)_2 6H_2O$ (SdM) solution corresponding to 500 mg of SdM, are fed.

The autoclave is kept under mechanical stirring and is pressurized with TFE up to a 20 bar pressure at a temperature of 75° C. At this point in the autoclave 500 cc of a $(NH_4)_2S_2O_8$ (APS) solution corresponding to 2,500 mg of APS are fed.

When the pressure in the reactor has decreased of 0.5 bar, TFE is fed by means of a compressor so as to maintain a constant pressure of 20 bar inside the reactor. In the meantime the reactor internal temperature is increased up to 85° C. at a rate equal to 0.2° C./min. After 70 minutes the TFE feeding is stopped, the reactor is evacuated and cooled. An aqueous dispersion containing 100 g/kg of polymeric resin is obtained. The polymer contains 0.4% by weight of HFP.

The polymer primary particle diameter measured by Laser Light Scattering (LLS) is equal to 55 nm. The fibril number determined as mentioned is higher than 50%.

Example 4

16,500 grams of the microemulsion of Example 2 are added to 275 liters of suitably degassed water into a 440 liters autoclave equipped with a mechanical stirrer and previously put under vacuum. In the reactor also 1,000 grams of paraffin with softening point in the range 52–54° C. and 3,200 grams of perfluoro-5-methoxy-1,3-dioxole (MDO) were previously introduced. The autoclave is kept under mechanical stirring and is pressurized with TFE up to a 20 bar pressure at a temperature of 78° C. At his point in the autoclave 1,500 cc of a $(NH_4)_2S_2O_8$ (APS) solution corresponding to 18 grams of APS, are fed.

When the pressure in the reactor has decreased of 0.5 bar, TFE is fed by means of a compressor so as to maintain a constant pressure of 20 bar inside the reactor. In the meantime the reactor internal temperature is increased up to 91° C. at a rate equal to 0.6° C./min. After 41 minutes the TFE feeding is stopped, when 90 kg of TFE have reacted, the reactor is evacuated and cooled.

The polymer primary particle diameter measured by Laser Light Scattering (LLS) is equal to 46 nm.

The FTIR analysis shows a MDO content in the polymer equal to 2.22% by weight and the DSC analysis shows a first melting point equal to 326.4° C.

The melt flow index (MFI), according to the ASTM D1238-52T method, was not measurable: this shows that the polymer is not processable from the melt. The fibril number determined as indicated is lower than 1%.

Example 5 Comparative 4,000 grams of the microemulsion of Example 2 are added to 30 liters of suitably degassed water into a 50 liters autoclave equipped with a mechanical stirrer and previously put under vacuum. In the reactor also 122 grams of perfluoro-5-methoxy-1,3-dioxole (MDO) were previously introduced. The autoclave is kept under mechanical stirring and is pressurized with TFE up to a 20 bar pressure at a temperature of 95° C. At this point in the autoclave 1,500 cc of a $(NH_4)_2S_2O_8$ (APS) solution corresponding to 10 grams of APS, are fed.

When the pressure in the reactor has decreased of 0.5 bar, TFE is fed by means of a compressor so as to maintain a constant pressure of 20 bar inside the reactor. In the meantime the reactor internal temperature is increased up to 110° C. After 4 minutes when 2,000 grams of TFE have reacted, the TFE feeding is stopped, and the reactor is evacuated and cooled.

The polymer primary particle diameter measured by Laser Light Scattering (LLS) is equal to 20 nm. The FTIR analysis shows a MDO content in the polymer equal to 0.9% by weight.

The melt flow index (MFI), according to the ASTM D1238-52T method, was not measurable: this shows that the polymer is not processable from the melt. The fibril number determined as indicated is greater than 10%.

Example 6 Comparative 1,800 grams of the microemulsion of Example 2 are added to 30 liters of suitably degassed water into a 50 liters autoclave equipped with a mechanical stirrer and previously put under vacuum. In the reactor also 125 grams of perfluoro-5-methoxy-1,3-dioxole (MDO) and 140 grams of paraffin with softening point in the range 52° C.–54° C., were previously introduced. The autoclave is kept under mechanical stirring and is pressurized with TFE up to a pressure of 20 bar at a temperature of 82° C. At this point in the autoclave 500 cc of a $(NH_4)_2S_2O_8$ (APS) solution corresponding to 2,000 mg of APS, are fed.

When the pressure in the reactor has decreased of 0.5 bar, TFE is fed by means of a compressor so as to maintain a constant pressure of 20 bar inside the reactor. In the meantime the reactor internal temperature is increased up to 95° C. After 21 minutes the TFE feeding is stopped, the reactor is evacuated and cooled. An aqueous dispersion containing 291 g/kg of polymeric resin is obtained.

The polymer primary particle diameter measured by Laser Light Scattering (LLS) is equal to 47 nm. The MDO content in the polymer is equal to 0.75% by weight obtained by the mass balance.

The melt flow index (MFI), according to the ASTM D1238-52T method, was not measurable: this shows that the polymer is not processable from the melt. The fibril number determined as indicated is greater than 15%.

Example 7

200 grams of the microemulsion of Example 2 are added to 30 liters of suitably degassed water into a 50 liters autoclave equipped with a mechanical stirrer and previously put under vacuum. In the reactor also 150 grams of perfluoro-5-methoxy-1,3-dioxole (MDO) and 140 grams of paraffin with softening point in the range 52® C.–54° C., were previously introduced. The autoclave is kept under mechanical stirring and is pressurized with TFE up to a pressure of 20 bar at a temperature of 77° C. At this point in the autoclave 500 cc of a $(NH_4)_2S_2O_8$ (APS) solution corresponding to 1,000 mg of APS, are fed.

When the pressure in the reactor has decreased of 0.5 bar, TFE is fed by means of a compressor so as to maintain a constant pressure of 20 bar inside the reactor. In the meantime the reactor internal temperature is incresed up to 95° C. After 37 minutes the TFE feeding is stopped, the reactor is evacuated and cooled. An aqueous dispersion containing 304 g/kg of polymeric resin is obtained.

The polymer primary particle diameter measured by Laser Light Scattering (LLS) is equal to 77 nm.

The MDO content in the polymer is equal to 1.1% by weight obtained by the mass balance.

The melt flow index (MFI), according to the ASTM D1238-52T method, was not measurable: this shows that the polymer is not processable from the melt. The fibril number determined as indicated is lower than 5%.

Example 8

2,000 grams of the microemulsion of Example 2 are added to 30 liters of suitably degassed water into a 50 liters autoclave equipped with a mechanical stirrer and previously put under vacuum. In the reactor also 160 grams of perfluoro-5-methoxy-1,3-dioxole (MDO), 140 grams of paraffin with softening point in the range 52° C.–54° C. and 400 mbar of ethane ($C_2H_6$) were previously introduced. The autoclave is kept under mechanical stirring and is pressurized with TFE up to a 20 bar pressure at a temperature of 85° C. At this point in the autoclave 500 cc of a $(NH_4)_2S_2O_8$ (APS) solution corresponding to 2,500 mg of APS, are fed.

When the pressure in the reactor has decreased of 0.5 bar, TFE is fed by means of a compressor so as to maintain a constant pressure of 20 bar inside the reactor. In the meantime the reactor internal temperature is incresed up to 95° C. After 23 minutes the TFE feeding is stopped, the reactor is evacuated and cooled. An aqueous dispersion containing 220 g/kg of polymeric resin is obtained.

The polymer primary particle diameter measured by Laser Light Scattering (LLS) is equal to 20 nm.

The MDO content in the polymer is equal to 1.3% by weight obtained by the mass balance. The DSC analysis shows a first melting point equal to 320° C.

The melt flow index (MFI), according to the ASTM D1238-52T method, at 380° C. with a 3 kg load and nozzle having 1 mm diameter is 0.55 g/10 minutes. The product, after passage in the extruder (vertical head and calendering) Profil Dies (I) has not led to the manufacture of finished manufactured articles due to the low mechanical properties during the recrystallization phase from the melt. Therefore the product, notwithstanding the low melt viscosity, is not thermoprocessable. The fibril number determined as indicated is lower than 5%.

Example 9

In a 5 liter AISI 316 autoclave equipped with stirrer, after having been put under vacuum, 3 liters of demineralized and degassed water, PVE in an amount of 1.59 g per liter of water, the mixroemulsion of Example 2 in the amount of 8.33 g per liter of water, were in sequence introduced.

The autoclave was heated up to a constant temperature of 75° C. and pressurized with MVE up to 2.7 absolute bar, then the autoclave was pressurized to 21 absolute bar with a TFE and MVE mixture the molar ratio of which is 27.6.

When the working pressure was reached, a potassium persulphate solution having a molar concentration equal to 0.0028 was fed in a continuous way. The reaction was stopped after 65 minutes when 400 g of the TFE and MVE monomer mixture were fed. At the end of the reaction a latex characterized by a 53 nm particle size is discharged. The PVE amount is 0.9% by weight, the MVE amount is 5.6% by weight.

The melt flow index (MFI), according to the ASTM D1238-52T method, was not measurable: this shows that the polymer is not processable from the melt. The fibril number determined as indicated is lower than 5%.

APPLICATION EXAMPLES

Example 10 Comparative

Mixtures consisting of two polytetrafluoroethylene (-PTFE) dispersions are prepared, having a final solid percentage of 59% by weight with a weight ratio between the component a) and component b) of the mixture equal to 98/2, 96.5/3.5, 95/5, 92.5/7.5, 90/10.

The mixture component a) is a commercial product Ausimont Algoflon® D60 EXP96 having a 260 nm average diameter, while the component b) is the dispersion described in Example 1. The particle diameters, measured by the Laser Light Scattering method, are respectively 260 and 114 nm with a ratio between the particle diameters between component a) and component b) equal to 0.438.

The mixtures of the two dispersions contain 3% by weight of Triton X100 and are additivated with an acrylic paste so that the final composition of the formulation is that described hereinafter and sprayed on primerized aluminum sheets, dried at 100° C. for two minutes and then sintered at 420° C. for 10 minutes. The final composition of the applied acrylic formulation is constituted by the following parts by weight of the various components: 45% of PTFE, 1.5% of the Rhodopas D906 acrylic resin, 3.5% of Triton X100, 1.2% of sodium and triethanolamine lauryl acid salt, 2% of xylene, 2% of butylcellosolve and the complement to 100 is water.

On the sintered films the critical thickness is determined by optical microscopy. Such critical thickness is compared with that measured on the film obtained by the single component a) equal to 28 µm.

The results, shown in Table 1, show that the critical thickness does not increase for any tested percentage.

TABLE 1

| Component a)/<br>component b) ratio | Critical thickness<br>(µm) mixtures a) + b) | Critical thickness increase<br>vs comp. a) |
|---|---|---|
| 100/0 | 28 | 0 |
| 98/2 | 28 | 0 |
| 96.5/3.5 | 28 | 0 |
| 95/5 | 28 | 0 |
| 92.5/7.5 | 28 | 0 |
| 90/10 | 28 | 0 |

Example 11

Mixtures consisting of two polytetrafluoroethylene (-PTFE) dispersions are prepared, having a final solid percentage of 59% by weight with a weight ratio between the component a) and component b) equal to 96.5/3.5, 95/5, 92.5/7.5.

The mixture component a) is a commercial product Ausimont Algoflon® D60 EXP96 while the component b) is the polymer described in Example 4.

The particle diameters, measured by the Laser Light Scattering method, are respectively 260 and 46 nm with a ratio between the particle diameters between component a) and component b) equal to 0.177. The mixtures of the two dispersions contain 3% by weight of Triton X100 and are additivated with the acrylic paste so that the final formulation of the composition is that described in Example 10 and sprayed on primerized aluminum sheets, dried at 100° C. for two minutes and then sintered at 420° C. for 10 minutes.

On the sintered films the critical thickness is determined by optical microscopy. The critical thickness is compared with that measured on the film obtained by the single component a) equal to 30 μm. Furthermore the gloss is determined.

The results are summarized in Table 2.

TABLE 2

| Ratio comp. a)/ comp. b) | Critical thickness mixture a) + b) (μm) | Critical thickness increase (μm) vs component a) | gloss |
| --- | --- | --- | --- |
| 100 | 28 | 0 | 16 |
| 96.5/3.5 | 48 | 20 | 25 |
| 95/5 | 52 | 24 | 24 |
| 92.5/7.5 | 55 | 27 | 25 |

The scratch resistance on the films obtained from the mixtures of the a)+b) components has furthermore been measured in comparison with the film obtained by the single component a).

The experimental method to evaluate the scratch resistance consists in measuring the load weight connected to a sharp tip, necessary to cause a cut in the film. The test is carried out in air at room temperature and with the sheet dipped in water at 100° C. and in oil at 180° C.

The values indicated in Table 3 show that in all cases there is a film scratch resistance increase by passing from the film constituted by the single dispersion a) to the mixture of dispersions of the present invention.

The mixture component a) is a commercial product Ausimont Algoflon® D60 EXP96, while the component b) is the polymer described in Example 2.

The particle diameters, measured by the Laser Light Scattering method, are respectively 260 and 40 nm with a ratio between the particle diameters between component a) and component b) equal to 0.154.

The mixtures of the two dispersions contain 3% by weight of Triton X100 and are additivated with the acrylic paste so that the final formulation of the composition is that described in Example 10 and sprayed on primerized aluminum sheets, dried at 100° C. for two minutes and then sintered at 420° C. for 10 minutes.

On the sintered films the critical thickness is determined by optical microscopy. Moreover the gloss is determined. The critical thickness is compared with that measured on the film obtained by the single component a) equal to 28 μm. The results are summarized in Table 4.

TABLE 4

| Comp. a)/ comp. b) ratio | Critical thickness mixture a) + b) (μm) | Critical thickness increase (μm) vs component a) | gloss |
| --- | --- | --- | --- |
| 100/0 | 28 | 0 | 16 |
| 96.5/3.5 | 42 | 14 | 23 |
| 95/5 | 48 | 20 | 24 |
| 92.5/7.5 | 50 | 22 | 23 |

Example 13

Two mixtures consisting of two polytetrafluoroethylene (PTFE) dispersions are prepared, having a final solid percentage of 59% by weight with a weight ratio between the component a) and component b) equal to 95.2/4.8.

The mixture component a) is constituted for both mixtures by a commercial product Ausimont Algoflon® D60 EXP96 having a particle average diameter equal to 260 nm while the component b) is constituted by the dispersions respectively described in Examples 2 and 4.

The particle average diameter of component b) and the per cent MDO content are shown in Table 5.

The dispersions b) of Examples 2 and 4 are photographed with the Atomic Force Microscopy technique.

The photos qualitatively show the fibril decrease and disappearance as the comonomer MDO percentage

TABLE 3

| Comp a) % by wt | Comp b) % by wt | Load T<sub>room</sub> (g) | Load in water 100° C. (g) | Load in oil 180° C. (g) | Load in oil 210° C. (g) | Load in oil 250° C. (g) |
| --- | --- | --- | --- | --- | --- | --- |
| 100 | 0 | 1370 | 990 | 700 | 660 | 500 |
| 96.5 | 3,5 | 1535 | 1035 | 935 | — | — |
| 95 | 5 | 1535 | 1100 | 955 | 880 | 825 |
| 97.5 | 2.5 | 1535 | 1135 | 985 | — | — |

Example 12

Mixtures consisting of two polytetrafluoroethylene (PTFE) dispersions are prepared, having a final solid percentage of 59% by weight with a weight ratio between the component a) and component b) equal to 96.5/3.5, 95/5, 92.5/7.5.

increases. In the case of the dispersions b) of Examples 4 and 2 having respectively MDO=2.22% and 1.67% by weight, the particles with fibrillar structure are almost absent and at any rate in a percentage lower than 1% and 5% respectively.

The prepared mixtures of the dispersions a) and b) contain 3% by weight of Triton X100 and are additivated with the acrylic paste described in Example 10 and sprayed on primerized aluminum sheets, dried at 100° C. for two minutes and then sintered at 420° C. for 10 minutes. On the sintered films the critical thickness is determined by optical microscopy.

In order to evaluate the ageing effect, the film critical thickness is determined in subsequent times (1 month, 2 months, 4 and 5 months) in order to evaluate if the critical thickness remains high in the time.

From the data shown in Table 5 it appears that in the present case wherein the dispersion b) has a low content of fibrils, the critical thickness remains high during the time according to the present invention.

The prepared mixtures of the dispersions a) and b) contain 3% by weight of Triton X100 and are additivated with the acrylic paste described in Example 10 and sprayed on primerized aluminum sheets, dried at 100° C. for two minutes and then sintered at 420° C. for 10 minutes. On the sintered films the critical thickness is determined by optical microscopy.

In order to evaluate the ageing effect, the film critical thickness is determined in subsequent times (1 month, 2 and 4 months) in order to evaluate if the critical thickness remains high in the time.

TABLE 5

| Diam. disp. b) (nm) | % MDO disp. b) | % fibril disp b) | Critical thickness after polymer. µm | Critical thickness after 1 month (µm) | Critical thickness after 2 months (µm) | Critical thickness after 4 months (µm) | Critical thickness after 5 months (µm) |
|---|---|---|---|---|---|---|---|
| 46 | 2.2 | <1% | 50 | 50 | 50 | 48 | 48 |
| 40 | 1.7 | <5% | 52 | 52 | 50 | 50 | 50 |

Example 14 Comparative

Two mixtures consisting of two polytetrafluoroethylene (PTFE) dispersions are prepared, having a final solid percentage of 59% by weight with a weight ratio between the component a) and component b) equal to 95.2/4.8.

The component a) of the mixture is formed for both mixtures by a commercial product Ausimont Algoflon® D60 EXP96 having a particle average diameter equal to 260 nm while the component b) is constituted respectively by the dispersions described in Example 3A (latex after ultracentrifugation having average diameter 35 nm) and in Example 6 (not centrifuged latex).

The particle average diameter of component b) and the per cent MDO content are shown in Table 6.

The dispersions b) of Examples 3A and 6 are photographed by the Atomic Force Microscopy technique.

The photos qualitatively show the fibril decrease and disappearance as the comonomer MDO percentage increases. In the case of the dispersions b) of Examples 3A and 6 having respectively MDO=0% and MDO=0.75% by weight, from the photo analysis it is evident that in the former case the dispersion particles have an almost completely fibrillar structure (fibrils >50%) and that also in the latter case the fibril percentage is very high (higher than 15%).

From the data shown in Table 6 it appears that in the present case wherein the dispersion b) has an high percentage of fibrils, the critical thickness quickly decreases during the time.

TABLE 6

| Diam. disp. b) (nm) | % comonomer MDO disp. b) | % fibril disp. b) | Critical thickness after polymer. µm | Critical thickness after 1 month (µm) | Critical thickness after 2 months (µm) | Critical thickness after 4 months (µm) |
|---|---|---|---|---|---|---|
| 35 | 0 | >50% | 55 | 54 | 30 | 30 |
| 47 | 0.75 | >15% | 55 | — | 45 | 40 |

Example 15

Multimodality Effect of the Microparticle Distribution

Mixtures consisting of two polytetrafluoroethylene (PTFE) dispersions are prepared, having a final solid percentage of 59% by weight with different ratios by weight between the component a) and component b).

The component a) of the mixture is constituted by a commercial product Ausimont Algoflon® D60 EXP96 having a diameter, determined by the Laser Light Scattering method, equal to 260 nm, while the component b) is a mixture of the following dispersions:

A=dispersion described in Example 8 (diam. 20 nm)
B=dispersion described in Example 4 (diam. 46 nm)
C=dispersion described in Example 7 (diam. 77 nm)

The average diameter of A+B+C is shown in Table 7. The fibril number determined as indicated is lower than 5%. The formulations of the mixtures a)+b) contain 3% by weight of Triton X100 and are charged with the acrylic paste described in Example 10 and sprayed on primerized aluminum sheets, dried at 100° C. for two minutes and then sintered at 420° C. for 10 minutes. On the sintered films the critical thickness is determined by optical microscopy. Such critical thickness is compared with that determined on the film obtained by the single component a) corresponding to 20 μm. The results are summarized in Table 7.

TABLE 7

| Composition dispersion b) A + B + C (% by wt) | Average diameter A + B + C (nm) | Component b) in mixture % by wt | Critical thickness increase vs component a) (μm) |
|---|---|---|---|
| 20-70-10 | 44 | 2 | 15 |
| " | " | 3.5 | 20 |
| " | " | 5 | 24 |
| 70-20-10 | 32 | 2 | 15 |
| " | " | 3.5 | 22 |
| " | " | 5 | 25 |
| 10-20-70 | 66 | 2 | 10 |
| " | " | 3.5 | 15 |
| " | " | 5 | 18 |

The data in Table 7 show that by widening the microparticle polydispersity (diameters from 20 to about 70 nm) until giving almost continuous distributions with the greatest particles, better application performances are obtained.

Example 16

Mixtures consisting of two polytetrafluoroethylene (PTFE) dispersions are prepared, having a final solid percentage of 59% by weight with a ratio by weight between the component a) and component b) equal to 96.5/3.5 and 95/5.

The component a) of the mixture is a commercial product Ausimont Algoflon® D60 EXP96 having an average diameter of 260 nm.

The component b) of the mixture is the polymer described in Example 8, which even though is within the viscosity limits of the thermoprocessable products (see Example 8), is not processable from the melt since its low molecular weight gives very poor mechanical properties in the recrystallization phase from the melt.

The particle diameters, determined by the Laser Light Scattering method, are respectively 260 and 20 nm with a ratio among the particle diameters between the component a) and the component b) equal to 0.077. The mixtures of the two dispersions contain 3% by weight of Triton X100 and are additivated with the acrylic paste described in Example 10 and sprayed on primerized aluminum sheets, dried at 100° C. for two minutes and then sintered at 420° C. for 10 minutes. On the sintered films the critical thickness is determined by optical microscopy. Such critical thickness is compared with that determined on the film obtained by the single component a).

The results are summarized in Table 8.

TABLE 8

| component b) % | Critical thickness increase (μm) |
|---|---|
| 3.5 | 22 |
| 5 | 22 |

The scratch resistance has moreover been determined on the films obtained from the mixtures of components a)+b) compared with the film obtained by the single component a).

The values mentioned in Table 9 show that there is a film scratch resistance increase by passing from the film consisting of the single dispersion a) to the mixture of dispersions of the present invention.

TABLE 9

| Comp. a) % by wt | Comp. b) % by wt | Load $T_{room}$ (g) | Load in water 100° C. (g) | Load in oil 180° C. (g) | Load in oil 210° C. (g) |
|---|---|---|---|---|---|
| 100 | 0 | 1370 | — | 700 | 660 |
| 96.5 | 3.5 | 1635 | — | 900 | 825 |
| 95 | 5 | 1635 | — | 920 | 835 |

Example 17

Mixtures consisting of two polytetrafluoroethylene (-PTFE) dispersions are prepared, having a final solid percentage of 59% by weight with a ratio by weight between the polymers equal to 95/5.

The mixture component a) is a commercial product Ausimont Algoflon® D60 EXP96 having an average diameter of 260 nm.

The mixture component b) is the polymer obtained in Example 9.

The particle diameters, determined by the Laser Light Scattering method, are respectively 260 and 53 with a ratio among the particle diameters between the component a) and the component b) equal to 0.2. The mixtures of the two dispersions contain 3% by weight of Triton X100 and are additivated with the acrylic paste described in Example 10 and sprayed on primerized aluminum sheets, dried at 100° C. for two minutes and then sintered at 420° C. for 10 minutes. On the sintered films the critical thickness is determined by optical microscopy. Such critical thickness is compared with that determined on the film obtained by the single component a). The gloss measurements are furthermore reported in Table 10.

TABLE 10

| component b) (% by wt) | Critical thickness increase vs component a) (μm) | Gloss |
|---|---|---|
| 5 | 22 | 25 |

The scratch resistance has moreover been determined on the films obtained from the mixtures a)+b) compared with the film obtained by the single component a).

The experimental method to evaluate the scratch resistance is described in Example 11.

The values mentioned in Table 11 show that in all cases there is a film scratch resistance increase, passing from the film consisting of the single dispersion a) to the mixture of dispersions of the present invention.

TABLE 11

| Comp. a) % by wt | Comp. b) % by wt | Load $T_{room}$ (g) | Load in water 100° C. (g) | Load in oil 180° C. (g) | Load in oil 210° C. (g) |
|---|---|---|---|---|---|
| 100 | 0 | 1370 | 990 | 700 | 660 |
| 95 | 5 | 1530 | 1110 | 800 | 780 |

Example 18

In impregnation tests on textiles (vertical application) a dispersion a) consisting of the commercial product Ausimont Algoflon® D1010 having an average diameter of 260 nm and a mixture of a) with the dispersion b) obtained in Example 2 and present in an amount of 5% by weight, are compared. The tests show that the amount of product deposited by each passage does not change in both cases. The addition of the type b) dispersion gives a critical thickness increase also on the film as such (i.e. not formulated with acrylic resins) and this can avoid the formation of cracks on the single impregnation steps. It is confirmed, from the data in Table 12, that there is also on the impregnated textile a critical thickness increase using a mixture a)+b).

TABLE 12

| Used product | No. passage | Deposited g/m$^2$ | NOTES |
|---|---|---|---|
| comp. a) | 1 | 50 | No cracks |
|  | 2 | 90 | crack presence |
|  | 3 | 120 | Crack presence |
|  | 4 | 138 | Crack presence |
|  | 5 | 160 | Crack presence |
| mixture a) + b) | 1 | 50 | No cracks |
|  | 2 | 92 | No cracks |
|  | 3 | 124 | No cracks |
|  | 4 | 139 | No cracks |
|  | 5 | 161 | No cracks |

Example 19

In the impregnation tests of Example 18 the effect of the adition of the thicknening additive of formula (Ia) both to the dispersion of the single component a), and to the mixture a)+b) defined in Example 18, has been controlled.

Such thickening agent, added in an amount of 0.1% by weight, is a fluorinated derivative having structure (Ia) wherein $R_f$, $R_f'=Cl(C_3F_6O)_{n'}$ with n'=3; $R_1$, $R_2$ =H; n=44;

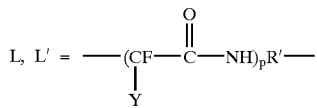

wherein: p=1; Y=F; R'=CH$_2$CH$_2$

From the data shown in Table 13 it appears that in both cases there is an increase of the amount of the polymer deposited in the various impregnation passages with respect to the case in which the thickener is not present (Example 18).

It is confirmed, from the data in Table 13, that also in the case of the addition of the thickening additive (Ia) on the impregnated textile, a critical thickness increase takes place using a mixture a)+b).

TABLE 13

| Used product | No. passage | Deposited g/m$^2$ | NOTES |
|---|---|---|---|
| comp. a) | 1 | 60 | Crack presence |
|  | 2 | 114 | Crack presence |
|  | 3 | 136 | Crack presence |
|  | 4 | 157 | Crack presence |
|  | 5 | 170 | Crack presence |

TABLE 13-continued

| Used product | No. passage | Deposited g/m$^2$ | NOTES |
|---|---|---|---|
| mixture a) + b) | 1 | 60 | No cracks |
|  | 2 | 96 | No cracks |
|  | 3 | 130 | No cracks |
|  | 4 | 154 | No cracks |
|  | 5 | 172 | No cracks |

Example 20 Comparative

A mixture consisting of two dispersions is prepared, having a final solid total percentage of 57% by weight with a ratio by weight between the polymers of the two dispersions respectively equal to 95.2/4.8. The mixture component a) is a commercial product Ausimont Algoflon® D60 EXP96 while component b) is obtained by Example 3B. The particle diameters, determined by the Laser Light Scattering method, are respectively 260 and 55 nm with a ratio of the particle diameters between the component b) and the component a) equal to 0.21.

The above mentioned dispersion mixture containing the total 3% of non ionic surfactant Triton X100 shows polymer sedimentation (4.5% by weight sedimented) in a time lower than 24 hours. Said mixture is charged with the acrylic paste of Example 10 and sprayed on a primerized aluminum sheet, dried at 100° C. for two minutes and then sintered at 420° C. for 10 minutes.

On the sintered film the critical thickness is determined by optical microscopy. Such critical thickness is determined immediately after the application and after 24 hours. It is compared with that determined on the film obtained by the sole component a). A critical thickness of 42 μm is determined for the mixture with component b) at 4.8% by weight in comparison with the critical thickness of the single component a) equal to 28 μm.

Therefore a critical thickness increase equal to 14 μm initially occurs; after 24 hours the critical thickness increase is reduced of 8 μm. Furthermore the initial gloss is not very high. The latex aged three months gives critical thickness substantially equal to those of the sole component a) (about 28 μm).

What is claimed is:

1. Fluoropolymer dispersion mixtures comprising:
   a) one or more dispersions comprising tetrafluoroethylene (TFE) homopolymers or copolymers with one or more monomers containing at least one ethylene unsaturation in amounts from 0 to 8% by weight and having an average particle size range from 180 to 400 nm;
   b) one or more tetrafluoroethylene (TFE) copolymer dispersions with one or more monomers containing at least one ethylene unsaturation, the comonomer amount being such that the dispersions contain a number of fibrils lower than ≦1 0% of the total number of particles, said fibrils being polymer particles with a length/diameter (UD) ratio higher than 5; dispersions having an average particle size smaller than about 90 nm; wherein the component b) contains a comonomer amount such that the resulting polymer is not elastomeric and the composition and viscosity characteristics of the melt are not thermoprocessable, and wherein the ratio between the particle sizes of the dispersions of b) compared with that of the dispersions of a) is lower than 0.3.

2. Dispersion mixtures according to claim 1, wherein the weight ratio between component a) and component b) as dry product ranges between 99/1 and 80/20.

3. Dispersion mixtures according to claim 1, wherein the dispersion b) has a widened distribution of the particle sizes towards the lower fractions of the dispersion a).

4. Dispersion mixtures according to claim 1, wherein the TFE comonomers are selected from the group consisting of:
- a $C_3$–$C_8$ perfluoroolefin;
- a hydrogenated $C_2$–$C_8$ fluoroolefin;
- a chloro-, bromo- and/or iodo- $C_2$–$C_8$-fluoroolefin;
- a (per)fluoroalkylvinylether (PAVE) of formula $CF_2=CFOR_f$, wherein $R_f$ is a $C_1$–$C_6$ (per)fluoroalkyl;
- a (per)fluoro-oxyalkylvinylether of formula $CF_2=CFOX$, wherein X is a $C_1$–$C_{12}$ alkyl, a $C_1$–$C_{12}$ oxyalkyl, or a $C_1$–$C_{12}$ (per)fluoro-oxyalkyl having one or more ethereal groups;
- a fluorodioxole; and
- a non-conjugated dien of formula:

wherein $X^1$ and $X^2$, identical or different from each other, are F, Cl or H; $X^3$ and $X^4$, equal to or different from each other, are F or $CF_3$.

5. Dispersion mixtures according to claim 4, wherein the comonomer amount in the polymer of dispersion b) is in a range of about 0.5–20% by weight.

6. Dispersion mixtures according to claim 4, wherein the monomer is (per)fluorodioxole of formula (I):

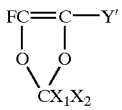

wherein Y' is —H, —Cl, —F, —$CH_3$, or —O—$CF_3$; and $X_1$ and $X_2$, identical or different from each other, are F or $CF_3$.

7. Dispersion mixtures according to claim 6, wherein the (per)fluorodioxole of formula (I) is in a range 1.1%–3% by weight.

8. Dispersion mixtures according to claim 1, wherein the dispersions of type b) are obtainable by a process comprising the following steps:
   a) preparing a perfluoropolyether (PFPE) aqueous microemulsion having perfluorinated end groups or Cl in substitution of fluorine;
   b) feeding the microemulsion into a polymerization reactor wherein the microemulsion contains a perfluoropolyether oil phase present in an amount higher than 2 ml per liter of reaction medium;
   c) degassing the reactor, pressurizing the reactor with gaseous TFE, and optionally adding surfactants, stabilizers, comonomers, or transfer agents;
   d) adding an initiator, and optionally adding during the polymerization surfactants, stabilizers, comonomers, or transfer agents; and
   e) discharging the dispersions from the reactor.

9. Dispersion mixtures according to claim 1, wherein the dispersion mixture is formulated with other resin aqueous dispersions, pigments, surfactants, or inorganic fillers.

10. Dispersion mixtures according to claim 9, wherein the surfactants comprise a compound of formula (Ia):

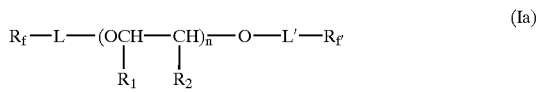

wherein n is an integer in the range 4–60;
L and L', equal to or different from each other, are selected from the group consisting of

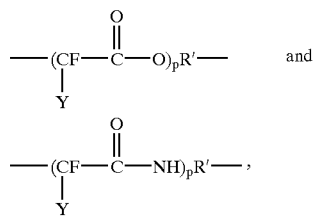

wherein p is 0 or 1;
Y is F or $CF_3$; and
R' is a $C_1$–$C_5$ alkylene radical;
$R_1$, $R_2$ are both H or one is H and the other is $CH_3$;
$R_f$ and $R_{f'}$ identical or different from each other, are perfluoropolyether radicals having a number average molecular weight in the range 250–1500; or
perfluorocarbon radicals having the above mentioned average molecular weight.

11. Dispersion mixtures according to claim 10, wherein the $R_f$ and $R_{f'}$ perfluoropolyether radicals comprise a T end group and repeating units statistically distributed along the polymer chain selected from the group consisting of
—$CFXCF_2O$— or —CFXO—, wherein X is F or —$CF_3$;
—$CF_2(CF_2)_zO$—, wherein z is an integer equal to 2 or 3;
—$CF_2CF(OR_{f''})O$— or —$CF(OR_{f''})O$—, wherein $R_{f''}$ is selected from the group consisting of
—$CF_3$, —$C_2F_5$ and —$C_3F_7$; and
the T end group of the perfluoropolyether radical is selected from the group consisting of —$CF_3$, —$C_2F_5$, —$C_3F_7$, $ClCF_2CF(CF_3)$—, $CF_3CFClCF_2$—, $ClCF_2CF_2$—, $ClCF_2$—, $CF_3CFHCF_2$—, $HCF_2CF_2$— and $HCF_2$—.

12. Dispersion mixtures according to claim 10, wherein the surfactants comprise a fluorinated non-ionic compound of formula (Ib):

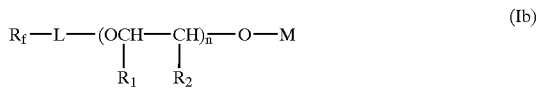

wherein
M is H or $CH_3$; and
$R_f$, L, $R_1$, $R_2$, n are defined according to claim 10.

13. Dispersion mixtures according to claim 1, wherein the concentration of dry product is in a range of 25%–75% by weight.

14. A method for coating metal or ceramic surfaces comprising applying dispersion mixtures of claim 1.

15. A method for coating a textile comprising impregnating the textile with dispersion mixtures of claim 1.

16. A method for coating a cast-film comprising applying dispersion mixtures of claim 1.

17. A process for preparing dispersion b) according to claim 1, comprising steps:
- a) preparing a perfluoropolyether (PFPE) aqueous microemulsion having perfluorinated end groups, optionally containing 1 or more H atoms, with chlorine optionally being substituted for fluorine;
- b) feeding the microemulsion into a polymerization reactor wherein the microemulsion contains a perfluoropolyether oil phase present in an amount higher than 2 ml per liter of reaction medium;
- c) degassing the reactor, pressurizing the reactor with gaseous TFE, and, optionally, adding surfactants, stabilizers, comonomers, or transfer agents;
- d) adding an initiator, and, optionally, adding during the polymerization surfactants, stabilizers, comonomers, or transfer agents; and
- e) discharging the dispersions from the reactor.

\* \* \* \* \*